Oct. 6, 1942.  C. R. SCHENK  2,298,175
HEATING APPARATUS
Filed Sept. 7, 1940  3 Sheets-Sheet 1

Witness:
John H. Cave

Inventor
Carl R. Schenk
By John F. Heine
Attorney

Oct. 6, 1942.   C. R. SCHENK   2,298,175
HEATING APPARATUS
Filed Sept. 7, 1940   3 Sheets-Sheet 2
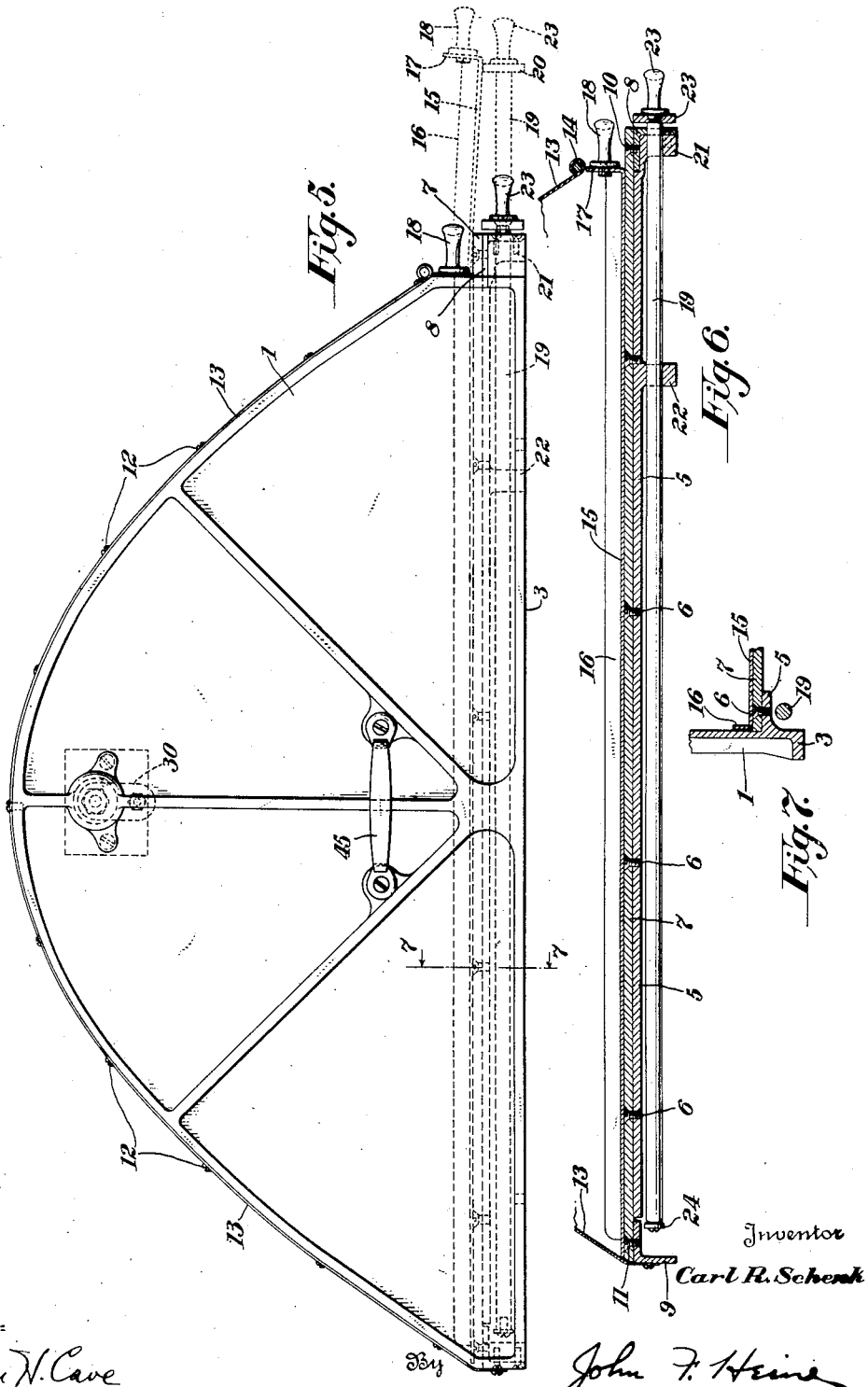
Inventor
Carl R. Schenk Oct. 6, 1942.    C. R. SCHENK    2,298,175
HEATING APPARATUS
Filed Sept. 7, 1940    3 Sheets-Sheet 3

Inventor
Carl R. Schenk

Witness:
John N. Cave

By John F. Heine
Attorney

Patented Oct. 6, 1942

2,298,175

UNITED STATES PATENT OFFICE 2,298,175

HEATING APPARATUS

Carl R. Schenk, Jersey City, N. J., assignor to The Singer Manufacturing Company, Elizabeth, N. J., a corporation of New Jersey Application September 7, 1940, Serial No. 355,769

7 Claims. (Cl. 219—34)

This invention relates to improvements in electric heating apparatus more particularly of the type adapted for use in heating sheets of thermoplastic materials, such as employed in the production of dress-forms of human models of the type forming the subjects of the pending U. S. patent applications of Stanley P. Lovell, filed Nov. 13, 1939, with Serial No. 304,209, and Ralph F. Palmer et al., filed Apr. 27, 1940, with Serial No. 331,976.

Generally speaking, the dress-forms of the above mentioned patent applications are produced by taking appropriate shaped panel-sections of suitable thermoplastic sheet-material, having the property of being hard at room temperature and plastic or limp when heated to approximately 140° F.; heating the panel-sections to the required degree of temperature; applying the heated panel-sections upon the protected torso of the human model and molding the same to the contour of the model; allowing the panel-sections to cool and harden; and then removing the hardened shell from the model for reassembly. In the process of producing the dress-form it is essential that the panel-sections be properly heated to the required temperature in a relatively short period of time so that no unnecessary delay will be experienced in preparing the panel-sections for use in the dress-forms.

It is the primary object of the present invention to provide a heating apparatus particularly adaptable for uniformly heating relatively large panel-sections of thermoplastic material at a minimum expenditure of electric energy.

The invention further consists in the particular combination, construction, association and relative arrangement of the several parts and features of the apparatus as illustrated in the accompanying drawings, in which:

Fig. 5 is an enlarged end elevational view of the apparatus in closed or operating position, and also with the work-receiving tray and tray-supporting frame partially retracted, as shown in dotted lines, to illustrate the manner in which the panel-sections are placed upon and removed from the tray.

Fig. 6 represents a vertical sectional view taken substantially along the line 6—6, Fig. 3.

Fig. 7 represents a vertical sectional view taken substantially along the line 7—7, Fig. 5.

Figure 1:
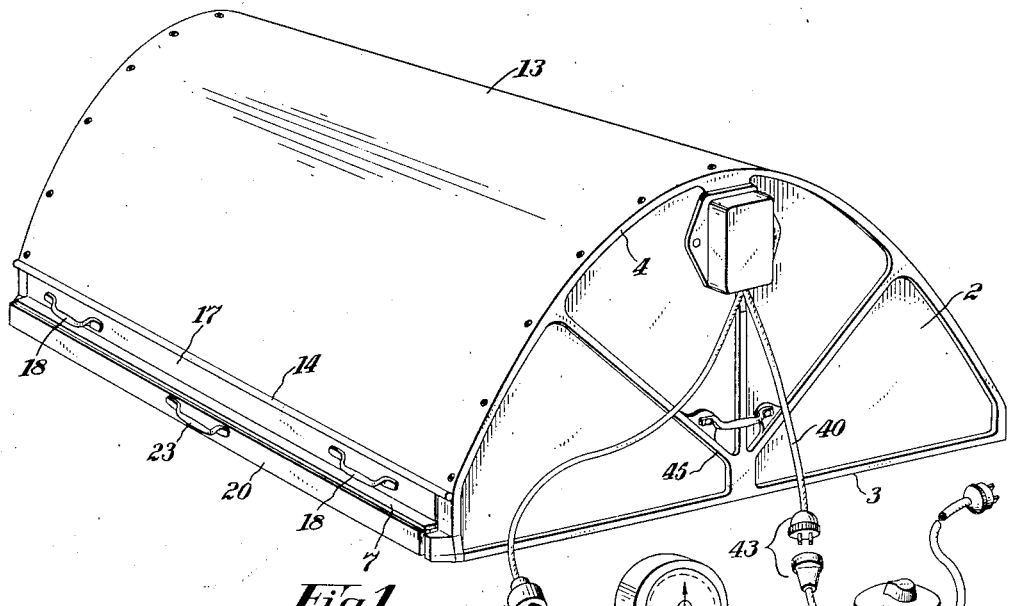
Fig. 1 is a perspective view of the improved heating apparatus showing the same adapted to be connected to a source of electrical energy through an adjustable rheostat and an automatic time-switch.
Figure 3:
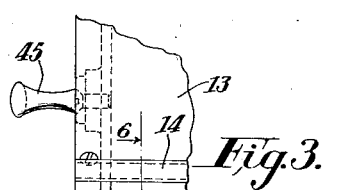
Fig. 3 is a fragmentary front elevational view of the lower left-hand portion of the apparatus.

Referring particularly to the drawings the heating apparatus preferably comprises a closed casing including two end-sections 1 and 2, each of which is formed with a flat base 3 and a substantially parabolic upper edge 4. In the present embodiment of the invention the end-sections 1 and 2 are formed of cast aluminum, but it is to be understood that these end-sections may be made of any suitable material, such as sheet-metal or the like. Each of the end-sections adjacent its flat base 3 is formed with a lateral flange 5 providing a supporting ledge upon which is secured by screws 6 a base-board 7. The base-board 7 is preferably composed of insulating material, such as transite asbestos board. Extending across the full width of the base-board 7 at its front and rear edges are angle-iron members 8 and 9, see Fig. 6. These angle-iron members are secured to the base-board 7 by screws 10 and 11, and with the lateral flanges 5 of the two end-sections 1 and 2 provide a rectangular frame acting as reinforcement for said base-board 7.

Secured to the angle-iron member 9 at the back of the heater and fixed to the parabolic shaped edges of the end-sections by screws 12 is a relatively thin sheet-metal reflector 13 terminating at the front of the heater in a rolled edge 14 which is vertically spaced from the base-board 7 to provide an opening through which may slide a retractable work-receiving tray 15. The tray 15, which is slidably supported directly upon the base-board 7, is preferably formed of sheet-metal having side-flanges 16 and an upturned end-flange 17. The end-flange is sufficiently high to completely close the opening between the rolled edge 14 of the reflector 13 and the baseboard 7 when the tray 15 is closed, see Fig. 6. In order that the work-receiving tray may be conveniently retracted the upturned end-flange 17 has secured thereto two spaced handles 18.

Figure 4:
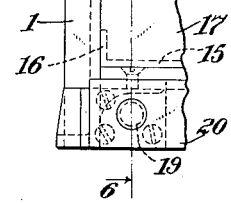
Fig. 4 is a fragmentary bottom view of the apparatus, showing the spaced lugs in which one of the rods of the U-shaped tray-supporting frame is endwise slidable.

To provide a support for the work-receiving tray when the latter is fully retracted to expose the thermoplastic panel-section, there is provided a U-shaped tray-supporting frame comprising two slide-rods 19 connected together at their outer ends by a cross-member 20. Each of the rods 19 (Figs. 4 and 6) is endwise slidable in spaced lugs 21 and 22 formed integral with the end-sections 1 and 2. To facilitate retraction of the tray-supporting frame, the cross-member 20 has fixed thereto a handle 23. The fully retracted position of the tray-supporting frame is determined by stops 24 secured upon the inner end of each of the slide-rods 19, these stops cooperating with the lugs 22. When the heating apparatus is in use and it is desired to either place a panel-section on the tray 15 or remove one therefrom after it has been properly heated, the tray-supporting frame is first retracted to its fullest extent or until the stops 24 contact the lugs 22, and then the tray 15 can be withdrawn and its outer end rested upon the tray-supporting frame. In this way, the tray is not subjected to any strain and also the operator of the heater does not need to manually support the tray, but can devote his entire attention to either placing the panel-section upon the tray or removing the same for application to the dress-form. While in the present embodiment of the invention there are only two slide-rods 19 shown, it is to be understood that three or more uniformly spaced slide-rods could be employed, each connected at its outer or exposed end to the cross-member 20.

The heat used for rendering the panel-sections plastic emanates from a heating unit extending the full length of the apparatus and located slightly above the focal line of the parabolic reflector 13. It has been found desirable to position the heating unit above the focal line of the reflector 13 so that the rays of radiant energy reflected may be diverged to cover more or less evenly the entire surface of the panel-section on the tray 15.

Figure 8:
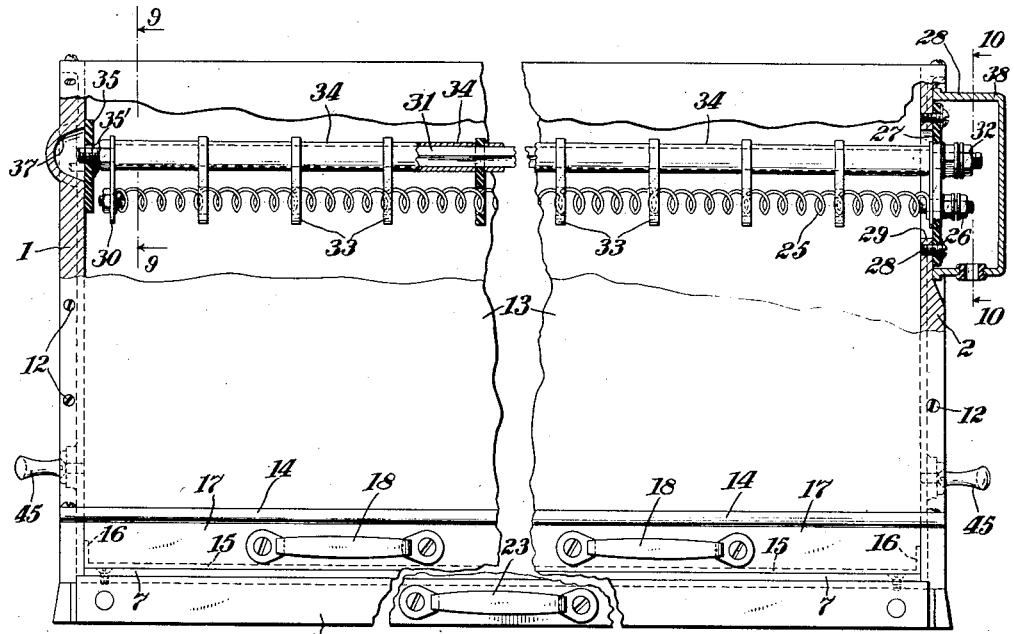
Fig. 8 is a front elevational view of the apparatus, partly in section to show the details of construction of the heating filament and the way in which the same is supported.
Figure 9:
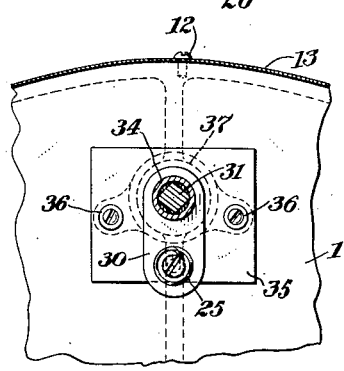
Fig. 9 represents an enlarged vertical sectional view taken along the line 9—9, Fig. 8.
Figure 10:
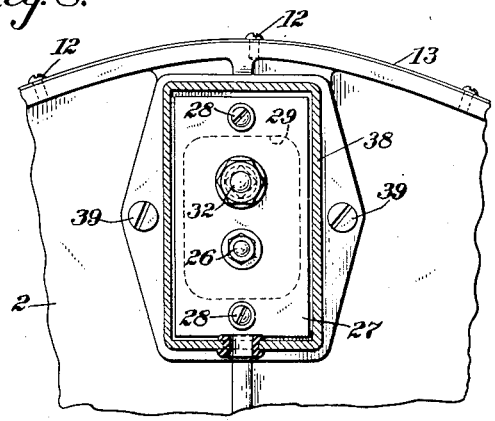
Fig. 10 represents an enlarged vertical sectional view taken along the line 10—10, Fig. 8.

The heating unit used in the present heater and best illustrated in Fig. 8, comprises a coil of resistance wire 25 connected at one end to a terminal post 26 mounted upon a plate 27 made of suitable insulation material, such as transite asbestos board. The plate 27 is detachably secured by screws 28 upon the end-section 2 and is sufficiently large to close the clearance opening 29 in said end-section. The other end of the resistance wire 25 is connected to a depending metal plate 30, the upper end of which is secured upon a coil-supporting brass rod 31 disposed parallel to the resistance wire 25 and rigidly secured to the plate 27 to provide the second terminal post 32 of the heating unit. Equally spaced along the coil-supporting rod 31 are a plurality of depending insulators 33, preferably made of lava or isolatite, which are apertured at their lower ends to receive and support the coiled resistance wire 25. These insulators are clamped in fixed spaced relation by spacing collars 34 surrounding the coil-supporting rod 31. As indicated above, one end of the heating unit is supported and securely fastened in position by the plate 27. The other end of the heating unit is adapted to rest on an insulation plate 35 attached by screws 36 to cover a recess 37 formed in the end-section 1 and opening into the inner face thereof. The plate 35 has formed therein an aperture 35' adapted to loosely receive the end of the coil-supporting rod 31.

The heating unit is preferably made as a unitary lineal assembly mounted upon the insulation plate 27. When constructed in this manner the heating unit may be readily removed in one piece for repair or replacement by simply removing the screws 28 and withdrawing the heating unit through the clearance opening 29 in the end-section 2. In replacing the heating unit, the end remote from the plate 27 is passed through the clearance opening 29 and the end of the coil-supporting rod 31 inserted into the aperture 35' in the plate 35 attached to the end-section 1. Screws 28 are then threaded into place and secure the heating unit in operative position. The terminal posts 26 and 32 of the heating unit are housed within a terminal cover-box 38 fastened by screws 39 upon the end-section 2.

Electrical current is supplied to the heating unit through a conduit 40 which has suitably connected therewith a rheostat 41 and an automatic time switch 42. The rheostat and time switch are employed so that an accurate control may be maintained of the temperature to which the thermoplastic panel-sections are heated. The rheostat 41 and time switch 42 are preferably connected through conventional twist-lock connectors 43 and 44 so that they may be detached to facilitate the shifting of the heating apparatus from place to place. The end-sections of the heater are fitted with handles 45 which may be grasped when it is desired to carry the heater from one location to another.

Figure 2:
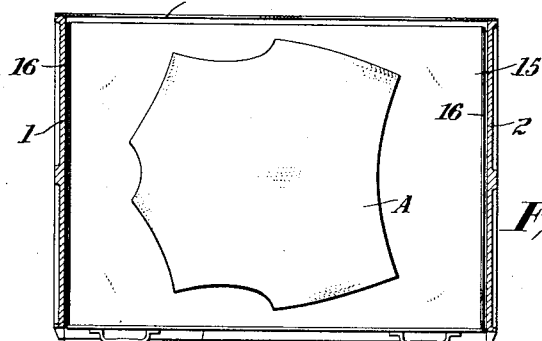
Fig. 2 represents a horizontal sectional view on reduced scale taken through the apparatus directly above the tray, illustrating one of the panel-sections of thermoplastic material arranged upon the tray for heating.

It will be understood from the above description that there has been provided an improved and novel heating apparatus adapted particularly for use in heating sheets of thermoplastic material to a predetermined temperature in a relatively short time and with the minimum expenditure of electric energy. Fig. 2 of the drawings shows by way of illustration one panel-section A of thermoplastic material disposed upon the tray 15. During the process of constructing the dress forms disclosed in the hereinbefore mentioned patent applications, it is desirable that only one panel-section of thermoplastic material be placed upon the tray at one time, so that when the same is ready for use it will be in the proper state of plasticity.

While the above description deals with only one form of the heating apparatus, it is to be understood that it is merely the preferred form, and that modifications may be made in the structural details without departing from the spirit of the invention.

Having thus set forth the nature of the invention, what I claim herein is:

1. A heating apparatus of the class described comprising, two end-sections each formed with a flat base and a substantially parabolic upper surface, a base-board having its opposite ends secured to the end-sections adjacent the flat bases thereof, a reflector overlying at least a portion of said upper surfaces and secured thereto so as to conform to the substantially parabolic shape thereof, said reflector having its front edge vertically spaced from said base-board to provide an opening, a retractable work-receiving tray slidable through said opening and adapted normally to be positioned beneath said reflector and when so positioned to completely close said opening, and a lineal heating unit extending substantially the full length of said reflector and disposed relative thereto so that the rays of radiant energy emanating from the heater cover uniformly the work-supporting surface of said tray, said heating unit being fastened to at least a portion of one of said end-sections and removable with said portion as a unit and being unattachably supported at its other end by the other of said end-sections.

2. A heating apparatus of the class described comprising, a casing including two vertically disposed parallel end-sections one of which is formed with a clearance opening therein, a substantially parabolic reflector connecting said end-sections, a retractable work-supporting tray adapted normally to be positioned beneath said reflector, a plate formed of insulation material and detachably secured to said end-section to completely cover the clearance opening therein, and a unitary heating means sustained by said plate beneath said reflector and removable therefrom as a unit, said plate forming the sole fastening means for said unit.

3. A heating apparatus of the class described comprising, a casing including a parabolic reflector, a retractable work-supporting tray adapted normally to be positioned beneath said reflector and when so positioned to completely close said casing, and a unitary heating unit disposed beneath said reflector so that the rays of radiant energy emanating from said unit are dispersed by the reflector to cover with uniform intensity the surface of said work-supporting tray, said heating unit comprising a supporting plate of insulation material, a coil-supporting rod rigidly fixed to said plate, a coiled resistance wire connected at one end to said supporting plate and at its other end to said rod, and a plurality of insulators depending from said rod for sustaining said coiled resistance wire intermediate its ends.

4. A heating apparatus of the class described comprising, a casing including a parabolic reflector, a retractable work-supporting tray adapted normally to be positioned beneath the reflector and when so positioned to completely close said casing, and a unitary heating unit detachably fastened to said casing and disposed relative to said reflector so that the rays of radiant energy emanating from said unit are dispersed by the reflector to cover with uniform intensity the surface of said work-supporting tray, said heating unit comprising a supporting plate of insulation material fitted with a terminal post, a coil-supporting rod rigidly fixed to said supporting plate and providing a second terminal post, a coiled resistance wire connected at one end to said first mentioned terminal post and at its other end to said coil-supporting rod, a plurality of insulators depending from said coil-supporting rod for sustaining said resistance wire intermediate its ends, and an electric conduit connected to said terminal posts for energizing said resistance wire.

5. A heating apparatus of the class described comprising, a casing including two end-sections connected together with a parabolic reflector, a retractable work-supporting tray adapted normally to be positioned beneath the reflector, a unitary heating unit within said casing and disposed relative to said reflector so that the rays of radiant energy emanating from said unit are dispersed by the reflector to cover with uniform intensity the surface of said work-supporting tray, said heating unit comprising a supporting plate detachably fastened to one of said end-sections and fitted with a terminal post, a coil-supporting rod rigidly fixed to said supporting plate and providing a second terminal post, a coiled resistance wire connected at one end to said first mentioned terminal post and at its other end to said coil-supporting rod, a conduit connected to said terminal posts for supplying current to said heating unit, and means fastened to the other end-section for unattachably supporting the free end of said heating unit.

6. A heating apparatus of the class described comprising, two end-sections each formed with a flat base, a substantially parabolic upper edge and a lateral flange, a flat base-board having its opposite ends secured to the flanges on said end-sections, a sheet-metal reflector attached to the upper edges of said end-sections and conforming to the substantially parabolic shape thereof, said reflector having its front edge vertically spaced from said base-board to provide an opening, a retractable work-receiving tray supported on said base-board and slidable through said opening and adapted normally to be positioned beneath said reflector and when so positioned to completely close said opening, a heating unit extending substantially the full length of said reflector and disposed relative thereto so that the rays of radiant energy emanating from the heating unit cover uniformly the work-supporting surface of said tray, and tray-supporting means slidably supported by said end-sections below said tray.

7. A heating apparatus of the class described comprising, two vertically disposed end-sections each formed with a flat base and a substantially parabolic upper surface, a horizontal base-board having its opposite ends secured to said end-sections, a sheet-metal reflector overlying at least a portion of said upper surfaces and secured thereto and extending from the base-board at the rear of the heater to a point vertically spaced from the base-board at the front of the heater, a retractable work-receiving tray slidably supported on said base-board and operable through the space between said reflector and base-board at the front of the heater, said tray adapted normally to be positioned beneath said reflector and when so positioned to completely close said space, and a heating unit supported by at least one of said end-sections and disposed relative to said reflector so that the rays of radiant energy emanating from the heating unit cover uniformly the work-supporting surface of said tray.

CARL R. SCHENK.